United States Patent [19]

Strum

[11] Patent Number: 5,695,099
[45] Date of Patent: Dec. 9, 1997

[54] SPORTSMAN BACK PACK

[76] Inventor: Alton R. Strum, 28 Bainbridge Ave., Hampton, Va. 23663

[21] Appl. No.: 762,160

[22] Filed: Dec. 9, 1996

Related U.S. Application Data

[62] Division of Ser. No. 373,063, Jan. 17, 1995, Pat. No. 5,607,089.

[51] Int. Cl.$^6$ ................................................. A45F 4/02
[52] U.S. Cl. ........................ 224/155; 224/642; 297/16.1; 297/129
[58] Field of Search ........................ 224/264, 155, 224/575, 576, 581, 584, 586; 297/129, 16.1, 53, 239, 452.14, 452.11, DIG. 2

[56] References Cited

U.S. PATENT DOCUMENTS

| | | | |
|---|---|---|---|
| 4,989,766 | 2/1991 | Lewallyn et al. | 224/155 |
| 5,105,910 | 4/1992 | Engstrom | 224/155 X |
| 5,265,780 | 11/1993 | Matthews et al. | 224/155 |

*Primary Examiner*—Renee S. Luebke
*Attorney, Agent, or Firm*—Wallace J. Nelson

[57] ABSTRACT

A combination back pack and seat combination including a molded one piece chair seat and backrest with one aspect (FIGS. 1–3) of the invention including foldable legs pivotally supported on the bottom of the chair seat and another aspect (FIGS. 4–6) of the invention including a single tubular chair support. In each aspect of the invention a pair of shoulder straps are secured to the backrest portion of the chair with each of the straps being constructed of a flexible cord material and provided with a protective cushioning covering to engage the shoulder of a person transporting the chair. In the single tubular chair support embodiment a foldable tree stand is also provided and includes a base platform supporting the chair seat and a first V-shaped segment to engage a tree trunk. A pair of pivotally connected arms extend from the base with a second V-shaped segment connected to the arms to also frictionally engage the opposite side of the tree trunk and provide support for the tree stand.

6 Claims, 2 Drawing Sheets

U.S. Patent    Dec. 9, 1997    Sheet 1 of 2    5,695,099
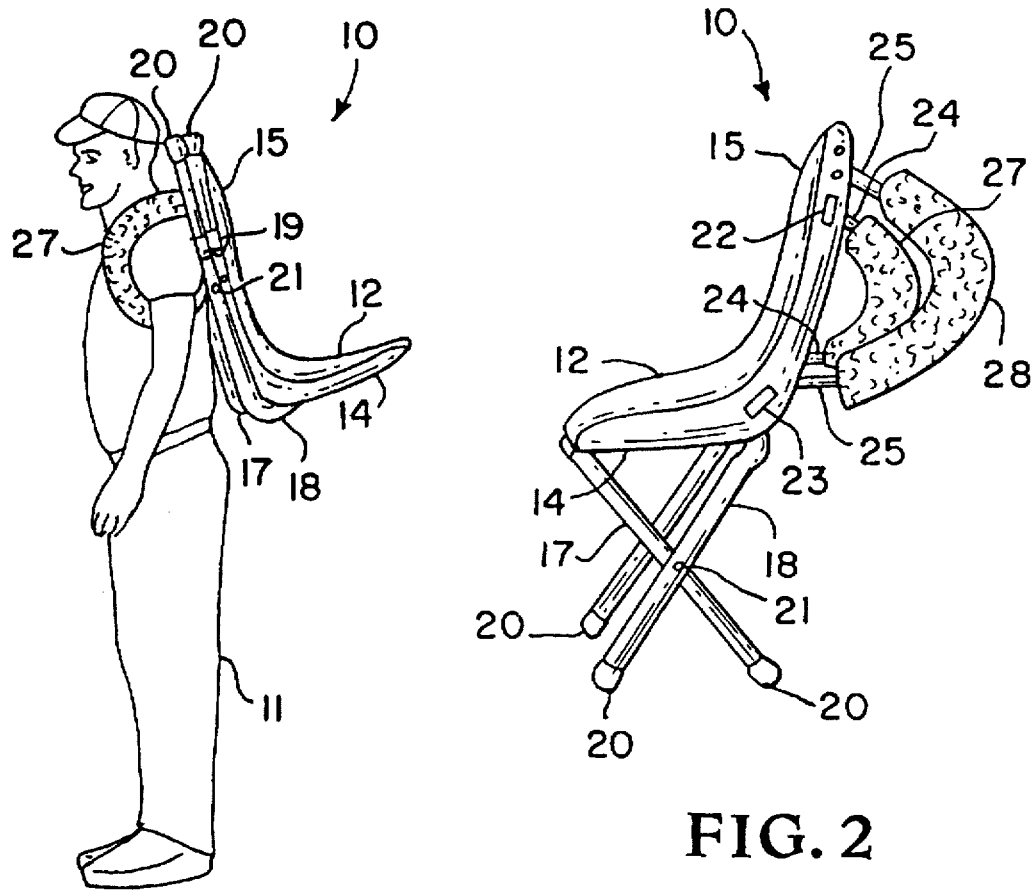
FIG. 1
FIG. 2
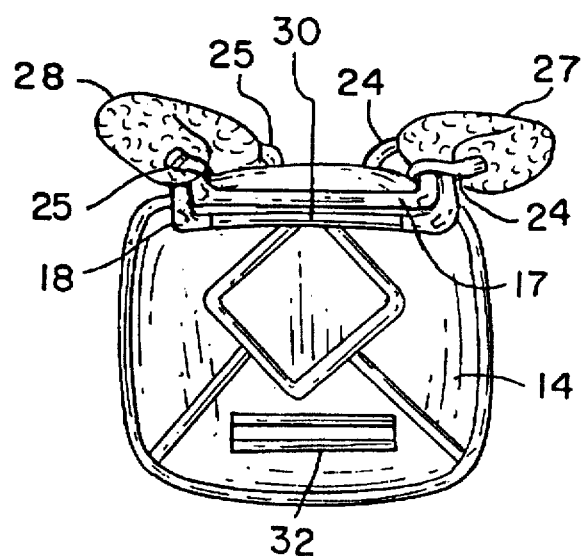
FIG. 3

SPORTSMAN BACK PACK

This is a division of application Ser. No. 08/373,063 filed on Jan. 17, 1995 (now U.S. Pat. No. 5,607,089).

FIELD OF THE INVENTION

This invention relates to back packs in general, and relates specifically to a combination back pack and chair for use in, or in combination with, tree stands, and the like.

BACKGROUND OF THE INVENTION

In the hunting of deer and other large game it is common practice for the hunter to employ a tree stand or other elevated structure to provide a wide field of view for approaching game. Some of the tree stands are simple and inexpensive, employing only some wooden planks, while others are constructed of metal or metal and wood combinations, and can be elaborate and expensive. Many of the tree stands are uncomfortable to the occupant when utilized for extended periods. Some commercially available trees stands, and some custom made stands, are constructed of metal parts that are heavy and difficult to transport to the site of use.

It is an object of the present invention to provide a combination back pack and tree stand chair that is comfortable to occupy, relatively lightweight in construction, and relatively simple to transport to the site of use.

Another object of the present invention is to provide a combination back pack and tree stand that is relatively simple in construction and provides a comfortable seat for the occupant hunter at the site of use.

An additional object of the present invention is a lightweight, inexpensive, combination back pack and seat for a sportsman.

Another object of the present invention is a back pack and portable chair for use alone or with a hunter's tree stand.

SUMMARY OF THE INVENTION

According to the present invention, the foregoing and additional objects are attained in one aspect of the invention by providing a chair having a molded one-piece seat and integral backrest. A pair of foldable chair legs are pivotally fixed to the bottom of the seat and maintained in folded position when transporting the chair and adapted to be unfolded when it is desired to employ the chair as an occupant support surface. A pair of flexible cord shoulder straps are releasably secured to the backrest portion of the chair and are provided with a protective cushion cover thereon to engage the shoulder of a person transporting the chair in back pack fashion. One member of the foldable legs is permanently and pivotally attached to the bottom of the chair seat and a spaced catch for the other leg is also provided on the bottom of the chair seat.

In another aspect of the invention, a foldable tree stand having a tree engaging portion and a hingedly connected chair support platform is provided in conjunction with a molded one-piece chair seat and backrest. In this embodiment, the foldable chair legs are replaced by a single support rod that engages a support plate secured to the bottom of the chair seat and a support plate secured to the chair support platform. As in the other embodiment, a pair of releasable flexible cord shoulder straps are secured to the backrest portion of the chair and provided with a protective cushioning cover thereon to engage the shoulder of a person transporting the chair and tree stand to a site of use. The tree stand is folded for back pack transport and unfolded and the chair seat attached at the site of use.

BRIEF DESCRIPTION OF THE DRAWINGS

A more complete appreciation of the invention and many of the attendant advantages thereof will be more readily appreciated as the same becomes better understood when considered in connection with the accompanying drawings wherein:

FIG. 1 is a schematic side view of the combination back pack and chair support of an embodiment of the present invention being transported by an individual;

FIG. 2 is a side view of the chair and back pack structure of FIG. 1 when unfolded at the site of use;

FIG. 3 is a schematic view of the bottom of the chair and back pack combination, shown in the folded position of FIG. 1, and illustrating the pivotal fixed attachment and the catch mechanism for the respective foldable legs of the chair;

DETAILED DESCRIPTION

Figure 4:
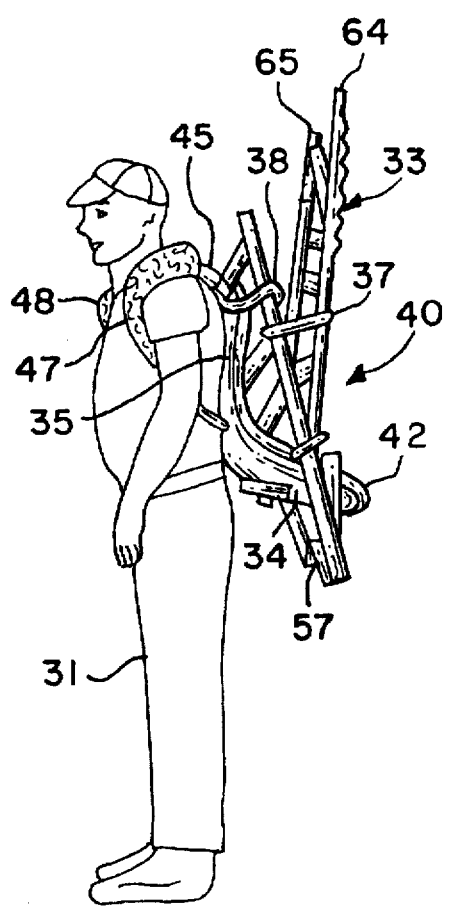
FIG. 4 is a schematic side view of another embodiment of the invention illustrating a combination back pack and folded tree stand with chair support and being transported by an individual.

Referring now to the drawings, and more particularly to FIG. 1, the combination back pack and foldable chair of the present invention is shown and designated generally by reference numeral 10. The back pack, chair combination 10, is in the folded position during transport by an individual, designated by reference numeral 11, and includes a chair 12. Chair 12 includes a seat portion 14 and an integral backrest portion 15. A pair of foldable legs 17, 18 are provided for chair 12 and are shown in the folded transport position in FIG. 1. A pair of retention straps, one of which is shown in FIG. 1 and designated by reference numeral 19, are wrapped around legs 17, 18 to assist in retaining the legs in the folded position of FIG. 1 during transport thereof. Strap 19, and the other (not shown) are constructed of Velcro or other suitable easily releasable material.

Legs 17, 18 are each formed of a substantially U-shaped structure including an elongated horizontal portion and a depending segment integrally extending from each end of the elongated horizontal portion. The depending segments of legs 17, 18 terminate in ground engaging free ends, each of which is provided with a suitable ground engaging tip cover as designated by reference numeral 20. The depending segments of legs 17, 18 are pivotally connected at substantially the intermediate length thereof by pivot pins 21, one of which is shown in FIG. 2 and the other of which is not visible in the drawings. A pair of brackets are provided on each side of chair 12 to permit attachment of a conventional supply backpack for retention on seat portion 14 thereof during transport. One pair of these brackets is illustrated in FIG. 2 and designated by reference numerals 22, 23.

A pair of shoulder straps 24, 25 are releasably attached manner to suitable slots, brackets or other conventional structure (not shown) in spaced relationship (on opposite sides) on the back of backrest 15 of chair 12. Shoulder straps 24, 25 are formed of suitable flexible cord such as "Bungee" cord and are capable of supporting considerable weight without stretching but will yield upon the exertion of a strong force thereon such as may be encountered with snagging onto tree limbs or underbrush while the user of the backpack system 10 is moving through the woods or in underbrush. Each of cords 24, 25 is provided with a shock cushioning material cover, as designated by respective reference numerals 27, 28. Cushioning material covers 27, 28 are formed of sheepskin, or synthetic fleece material, to minimize the pressure exerted on the user while transporting the back pack/chair combination.

As shown more particularly in FIG. 3, the horizontal portion of U-shaped leg 18 is rotatably or pivotally received through a length of tubular conduit 30 that is permanently secured (by adhesive or other conventional attachment) to the bottom of chair seat 14. Tubular conduit 30 is disposed adjacent to the rear portion of the bottom of seat 14, or near the lower end of the backrest portion 15 of chair 12. A catch 32 for receiving the horizontal portion of U-shaped leg 17 is adhesively, or otherwise conventionally, attached to chair seat 14 near the front thereof. Catch 32 is disposed in parallel relationship to conduit 30 and serves to releasably lock leg 17 in the expanded position when it is desired to use chair 12 as a human support surface. Catch 32 is formed of suitable tubular conduit (polyvinyl chloride or PVC) with approximately thirty-forty percent of the wall diameter being removed along the entire length of the conduit to form a slit therein, and providing a substantially C-shaped cross sectional area, that receives horizontal portion of U-shaped leg 17 in a "snapped in" releasable locked position, as illustrated in FIG. 2, and ready for use as a seat on a suitable tree stand or at any other site desired by the user. Tubular conduit 30 may also be provided with a slit along the length thereof to form a releasable catch for U-shaped leg 18 and thereby permit complete separation of legs 17, 18 from the chair, when so desired.

Figure 5:
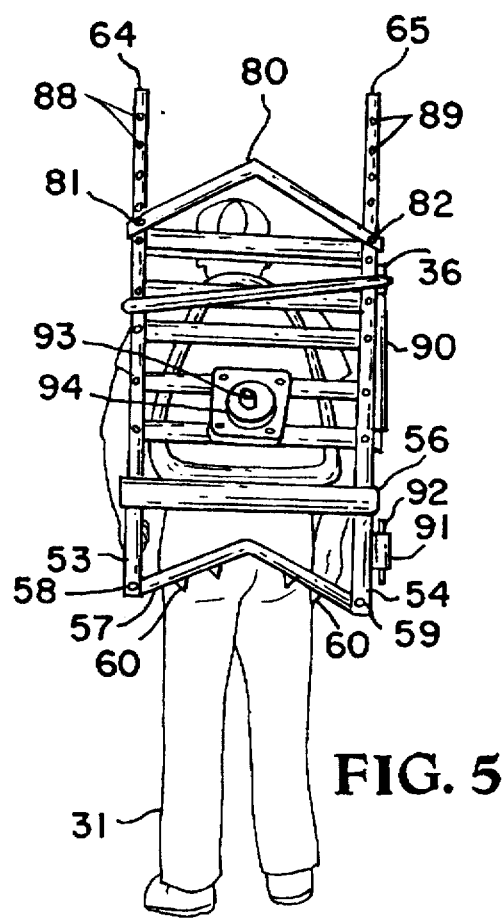
FIG. 5 is a rear view of the combination back pack and folded tree stand shown in FIG. 4.
Figure 6:
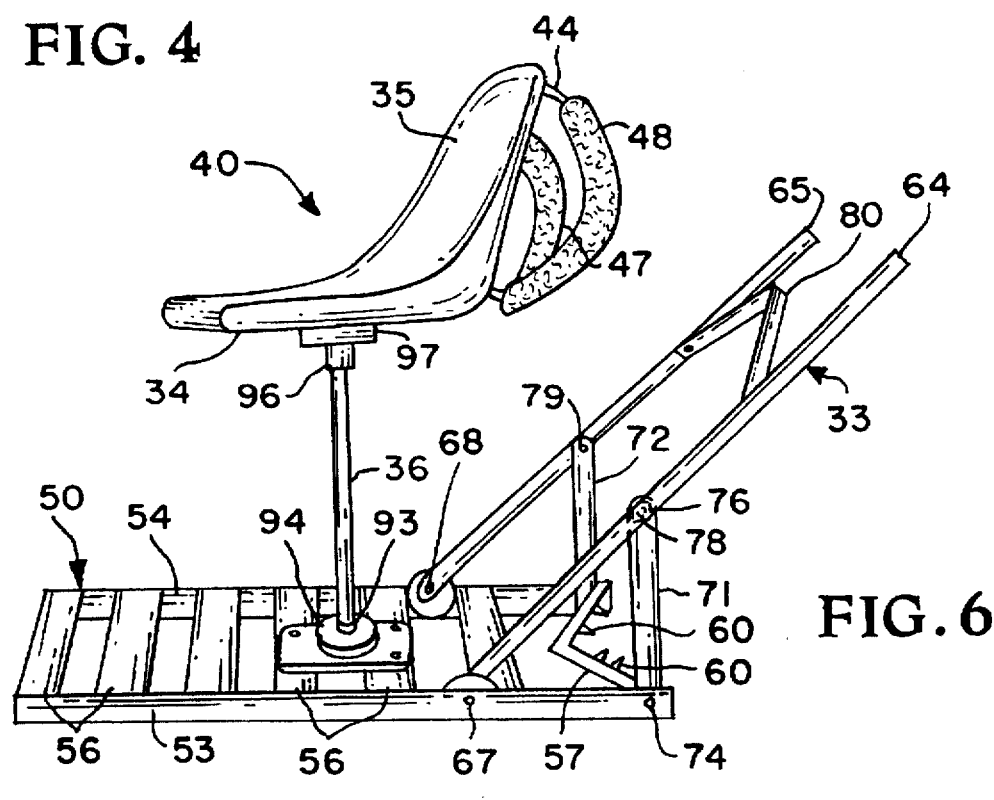
FIG. 6 is a schematic side perspective of the combination back pack and tree stand shown in FIGS. 4 and 5 in the unfolded assembled position at the site of use.

Referring now more particularly to FIGS. 4–6, another embodiment of the combination back pack and chair of the present invention is shown and designated generally by reference numeral 40. As shown therein, the back pack, chair combination 30, includes a foldable tree stand 33 with the chair structure 42 and tree stand 33 being in disassembled condition during transport by an individual, designated by reference numeral 31. Chair structure 42 includes a seat portion 34 and an integral backrest portion 35. In lieu of the folding legs of the previous embodiment, chair structure 42 is provided with a single column support rod 36 (FIG. 6), as will be further explained hereinafter. Tie-down straps 37, 38 are disposed in stretched position about the component parts of tree stand 33 and backrest 35 of chair structure 42 when in the transport position illustrated in FIG. 4.

As in the previously described embodiment, a pair of shoulder straps 44, 45 are attached to suitable slots, brackets, or other conventional structure (not shown) in spaced relationship and on opposite sides to the back of backrest 35 of chair 42. Shoulder straps 44, 45 are formed of suitable flexible cord such as "Bungee" cord and are capable of supporting considerable weight without stretching but will yield upon the exertion of a strong force thereon such as may be encountered with snagging onto underbrush or limbs in wilderness use. Each of cords 44, 45 is provided with a pipe insulation type cover having a sheath of sheepskin or synthetic fleece material thereon to serve as cushioning to prevent straps 44, 45 from cutting into the user's shoulders.

The tree stand 33 includes a base portion 50 having a pair of spaced, parallel, longitudinally extending metal segments, as designated by reference numerals 53, 54. Segments 53, 54 are maintained in parallel spaced relationship by a plurality of horizontally disposed plates, welded, bolted, or otherwise conventionally attached thereto, as designated by reference numeral 56. Plates 56 are disposed perpendicular to metal segments 53, 54 and are parallel to each other extending from a first end of segments 53, 54 along the length thereof to a distance spaced from a second end of segments 53, 54. The second ends of longitudinally extending metal segments 53, 54 are joined by a first V-shaped metal segment 57 bolted via bolts 58, 59 (FIG. 5) thereto with the bottom of the "V" extending within the spacing between the segments 53, 54. The open side of first V-shaped metal segment 57 is provided with extending metal spikes, designated by reference numeral 60, to engage a tree trunk surface for support of tree stand 33 at the site of use, as will be further explained hereinafter.

A pair of parallel arms 64, 65 having first and second end portions are pivotally connected at the first ends thereof to respective segments 53, 54 via respective pivot pins 67, 68 and in spaced relationship to the bottom of V-shaped metal segment 57.

A pair of parallel support brackets 71, 72 are pivotally connected at a first end thereof to the respective second ends of segments 53, 54 via a pair of pivot pins, one of which is shown in the drawing (for bracket 71) and designated by reference numeral 74, with the other pivot pin for bracket 72, not visible in the drawing. The second end of support brackets 71, 72 are releasably connected via inwardly extending fixed bolts 78, 79 disposed respectively on the inside surfaces of parallel arms 64, 65. Bolts 78, 79 are threadingly received by nuts welded or otherwise conventionally attached to the exterior of arms 64, 65. The nut for bolt 78 is secured to arm 64, as shown in FIG. 6 and designated by reference numeral 76, while that for bolt 79 and secured to arm 65 is not visible in this FIG. Support brackets 71, 72 serve to lock arms 64, 65 at a substantially forty-five degree angular relationship with base plate 50.

A second V-shaped metal segment 80 joins the second ends of respective parallel arms 64, 65 via bolts 81, 82 with the bottom of the "V" extending outwardly within the spacing between the second ends of arms 64, 65. Additional spaced holes 88, 89 are provided along a portion of the length of arms 64, 65 to permit adjustment of the position of V-shaped segment 80 relative to the second ends of arms 64, 65, as so desired. The open side of V-shaped segment 80 serves to engage a side of the tree trunk at the site of use opposite to the surface of the tree trunk engaged by first V-shaped segment 57 to act therewith to frictionally retain tree stand 33 thereon.

As mentioned hereinbefore, chair 40 is supported on tree stand 33 by a single rod or column 36. Rod 36 is carried in the back pack transport condition by a tubular conduit 90 formed of suitable plastic (PVC, or similar material). Tubing 90 is adhesively, or otherwise conventionally, attached to the side of arm 65 (FIG. 5). An additional shorter length of tubing or conduit 91 is also attached to the side of arm 65 and carries a short piece of metal pipe 92, having external threads (not designated) on one end thereof. Metal pipe 92 screws into an internally threaded coupling 96 that is welded or otherwise conventionally attached to a plate 97. A suitable pipe pod or other suitable connection can be employed for coupling 96 if so desired. Plate 97 is bolted or otherwise conventionally attached to the bottom of chair seat portion 34. A first end of chair support rod 36 is rotatably disposed over the length of pipe 92 extending from coupling 96 and abuts against the end of coupling 96. The second end of chair support rod 36 is provided with external threads over a portion of the length thereof, (not designated) and is threadingly received within an internally threaded second coupling or pipe pod 93. Threaded coupling 93 is welded to a plate 94 that is bolted or otherwise conventionally and releasably secured to one or more of plates 56 on base 50.

In operation, the chair/back pack/tree stand assembly 40, 33 is packaged as shown in FIGS. 4–5 for transport to a site of use within the hunting woods. At the site of use, the packaged arrangement is assembled as shown in FIG. 6. Second V-shaped segment 80 is removed from the assembly for positioning around the tree and the tree stand is raised to the desired height wherein the first V-shaped segment 57 is placed in engagement with one side of the tree trunk and retained thereon with the second V-shaped segment being positioned on the opposite side of the tree trunk.

Chair assembly 40 is then assembled and the frictional forces of the V-shaped segments 57 (including spikes 60) and 80 acting against the tree trunk will retain the tree stand 33 in position. The rotatable connection of chair 40 to the tree stand permits the hunter-occupant of the chair to rotate in an essentially 360 degree area for viewing the surrounding terrain.

In a specific embodiment of the present invention, one and one-half inch angle aluminum stock having a thickness of one-quarter inch, was employed for making base segments 53, 54. Arms 64, 65 were constructed from square metal tubing (aluminum or aluminum alloy) and first and second V-shaped segments 57, 80 were constructed from one inch angle iron. One-sixteenth inch aluminum, or aluminum alloy plate, with each plate having a width of three–four inches, was employed for constructing plates 56.

Although the invention has been described relative to specific embodiments thereof, it is not so limited and there are numerous modifications and variations of the invention that will be readily apparent to those skilled in the art in the light of the above teachings. For example, where specific materials have been mentioned it is to be understood that these materials are given by way of specific examples of the preferred embodiments and any equivalent material having equivalent structural and weather resistant properties are considered within the scope of the invention.

Also, in lieu of the Bungee cord attachment, conventional flat back pack straps may be employed with the present invention. Similarly, where no specific materials have been mentioned for the component parts, it is to be understood that any suitable material having the desired structural and weather resistant properties are considered applicable for practice of the present invention.

It is therefore to be understood that, within the scope of the appended claims, the invention may be practiced other than as specifically described herein.

What is claimed as new and desired to be secured by Letters Patent of the United States is:

1. A combination back pack and hunter's portable tree stand comprising in combination:
   a chair having a seat portion and an integral backrest portion;
   a pair of shoulder straps secured to said backrest portion of said chair;
   each member of said pair of shoulder straps being constructed of flexible cord material and provided with a protective cushion cover to engage a shoulder of a person transporting said chair;
   a foldable tree stand supported by said chair during backpack transport thereof;
   said foldable tree stand including a chair support platform and a pivotally connected tree engagement and support frame;
   means on said chair support platform to receive one end of a tubular elongated chair support rod;
   means on said seat portion of said chair to receive the other end of said tubular elongated chair support rod; and
   means secured to said pivotally connected tree engagement and support frame for releasably retaining said tubular elongated chair support rod during transport of said foldable tree stand.

2. The combination of claim 1 wherein said means on said chair support platform to receive said one end of said tubular elongated chair support rod comprises a rigid plate releasably secured to a surface of said chair support platform;
   said rigid plate including a tubular connecting element secured thereto;
   said tubular connecting element having a threaded center opening extending at least partially therethrough;
   said one end of said tubular elongated support rod having an externally threaded portion thereon;
   said externally threaded portion of said one end of said tubular elongated support rod being threadingly received by said threaded center opening of said tubular connecting element.

3. The combination of claim 2 wherein said means on said seat portion of said chair to receive the other end of said elongated chair support rod comprises a rigid plate fixedly secured to a bottom surface of said seat portion of said chair;
   said rigid plate fixedly secured to a bottom surface of said seat portion of said chair including a centrally disposed tubular connecting element extending perpendicularly therefrom;
   said centrally disposed tubular connecting element being provided with an internal threaded area;
   a length of tubular pipe having external threads over a portion of one end thereof and provided with a smooth surface over the remaining length thereof;
   said external threads threadingly attaching said length of tubular pipe to said centrally disposed tubular connecting element; and
   said smooth surface of said length of tubular pipe being slidably received by said other end of said tubular elongated support rod.

4. A combination back pack and support seat comprising, in combination:
   a chair having a seat portion and an integral backrest portion;
   means attachable to said seat portion to provide an elevated support for a chair occupant;
   a pair of shoulder straps secured to said backrest portion of said chair;
   said pair of shoulder straps being constructed of flexible cord material and provided with a protective cushion cover to engage the shoulders of a person transporting said chair;
   said means attachable to said seat portion to provide an elevated support for a chair occupant including a foldable tree stand supported by said chair during backpack transport thereof;
   said foldable tree stand including a chair support platform;
   a tree engagement and support frame pivotally connected to said chair support platform;
   a tubular elongated chair support rod;
   said tubular elongated support rod having a first end secured to said chair support platform and having a second end rotatably attached to said chair seat portion; and means secured to said pivotally connected tree engagement and support frame for releasably retaining said tubular elongated chair support rod during transport of said foldable tree stand.

5. The combination of claim 4 including a first rigid plate releasably secured to a surface of said chair support platform;

said first rigid plate including a tubular connecting element secured thereto;

said tubular connecting element having a threaded center opening extending at least partially therethrough;

said tubular elongated support rod being threadingly secured at one end thereof to said threaded center connecting element.

6. The combination of claim 4 including a second rigid plate fixedly secured to a bottom surface of said seat portion of said chair;

said second rigid plate including a centrally disposed tubular connecting element attached thereto and extending perpendicularly therefrom;

said centrally disposed tubular connecting element being provided with an internal threaded area;

a length of pipe having a threaded end secured to said centrally disposed tubular connecting element and a smooth surface end extending from said centrally disposed tubular connecting element;

said tubular elongated chair support rod including external threads over a portion of said other end thereof;

said other end of said elongated chair support rod slidably receiving said smooth surface end of said length of pipe to thereby provide rotatable occupant support for said chair on said portable tree stand.

* * * * *